United States Patent [19]

Yao et al.

[11] Patent Number: 5,759,718
[45] Date of Patent: Jun. 2, 1998

[54] ALKALINE STORAGE BATTERY AND METHOD FOR MAKING SAME

[75] Inventors: Takeshi Yao, Kamakura; Michio Ito, Yokohama; Tadaya Okada, Kamakura; Hajime Konishi, Chigasaki, all of Japan

[73] Assignee: Matsushita Electric Industrial Co., Ltd., Osaka, Japan

[21] Appl. No.: 570,872

[22] Filed: Dec. 12, 1995

[30] Foreign Application Priority Data

Dec. 19, 1994 [JP] Japan ................................. 6-314507
Dec. 6, 1995 [JP] Japan ................................. 7-317760

[51] Int. Cl.$^6$ ................................................. H01M 4/02
[52] U.S. Cl. ................................. 429/223; 423/592
[58] Field of Search ................................. 429/218, 223, 429/247, 206; 423/592

[56] References Cited

U.S. PATENT DOCUMENTS

| | | |
|---|---|---|
| 3,951,686 | 4/1976 | Ness et al. . |
| 4,603,094 | 7/1986 | Yasuda ................................. 429/91 |
| 4,935,318 | 6/1990 | Ikoma et al. . |
| 5,395,712 | 3/1995 | Furukawa ................................. 429/206 |
| 5,405,719 | 4/1995 | Sonoda et al. ................................. 429/223 |
| 5,451,475 | 9/1995 | Ohta et al. ................................. 429/212 |

FOREIGN PATENT DOCUMENTS

| | | |
|---|---|---|
| 61-49374A | 3/1986 | Japan . |
| 61-138458 | 6/1986 | Japan . |
| 62-66570 | 3/1987 | Japan . |
| 62-66570A | 3/1987 | Japan . |
| 62-237667 | 10/1987 | Japan . |
| 63-124370 | 5/1988 | Japan . |
| 3-145058A | 6/1991 | Japan . |
| 4-248262A | 9/1992 | Japan . |
| 6260166 | 12/1994 | Japan . |

OTHER PUBLICATIONS

Patent Abstracts of Japan, vol. 018, No. 658 (E-1643), 13 Dec. 1994 & JP-A-06 260166 (Yuasa Corp), 16 Sep. 1994.

Patent Abstracts of Japan, vol. 010, No. 263 (E-435), 9 Sep. 1986 & JP-A-61 088453 (Matsushita Electric Ind Co Ltd), 6 May 1986.

Patent Abstracts of Japan, vol. 017, No. 272 (E-1371), 26 May 1993 & JP-A-05 13078 (Sanyo Electric Co Ltd), 22 Jan. 1993.

*Primary Examiner*—M. Nuzzolillo
*Attorney, Agent, or Firm*—Watson Cole Stevens Davis, P.L.L.C.

[57] ABSTRACT

Provided are alkaline storage batteries which are higher in active material utilization as compared with conventional batteries and which can maintain the high utilization even after long-term charge-discharge cycle. Cobalt hydroxide having a BET specific surface area of 20–30 m$^2$/g and obtained by neutralization reaction of a cobalt salt solution and an aqueous alkali solution in the presence of a reducing agent is added to a positive electrode active material.

24 Claims, 10 Drawing Sheets

PROPORTION OF CoO IN COBALT COMPOUND

ALKALINE STORAGE BATTERY AND METHOD FOR MAKING SAME

BACKGROUND OF THE INVENTION

1. Field of the Invention

The present invention relates to alkaline storage batteries provided with nickel electrodes, such as nickel-cadmium storage batteries and nickel-hydrogen storage batteries and a method for making these batteries, and, more particularly, to a method for making the nickel electrodes.

2. Description of Prior Art

Alkaline storage batteries used as various electric sources are expected to have a high reliability and can be miniaturized and lightened in weight, and, for these reasons, small-sized batteries are now widely used for various portable equipments and large-sized batteries are widely used as industrial electric power sources.

In these alkaline storage batteries, hydrogen-absorption alloys are now used as active materials for negative electrodes in addition to cadmium, zinc and iron which have hitherto been used. On the other hand, mostly, nickel hydroxide is used as active materials for positive electrodes. The nickel positive electrodes which use nickel hydroxide as active materials can be roughly classified into two plate types: a sintered plate type and a pasted plate type. The steps for production of the sintered plates are troublesome in sintering substrates and filling the sintered substrates with an active material. Furthermore, if the porosity of the sintered substrate is higher than 83%, the mechanical strength thereof lowers, and, therefore, substrates of a higher porosity can hardly be obtained. Accordingly, there is a limit in the amount of the active material with which this substrate can be filled, and a higher capacity can hardly be obtained.

On the other hand, pasted nickel electrodes which are practically used at present are produced by filling with a pasty active material mainly composed of nickel hydroxide a foamed or fibrous nonwoven fabric substrate having a high porosity of higher than 90%. Batteries using the pasted nickel electrodes can be increased in its capacity as compared with those using the above-mentioned sintered nickel electrode. Therefore, the pasted nickel electrodes have been increasingly used as a positive electrode for high-capacity nickel-cadmium storage batteries and nickel-hydrogen storage batteries.

As active materials for the pasted nickel electrodes, nickel hydroxide to which a cobalt compound is added is mainly used. It is well known that a utilization of nickel hydroxide is improved by adding a cobalt compound to the nickel hydroxide. This cobalt compound is added mainly to impart electric conductivity to the nickel hydroxide and is readily oxidized at the time of initial charging to form an electrically conductive network comprising cobalt oxyhydroxide (hereinafter referred to as "CoOOH"). The formation of this electrically conductive network exhibits a considerable effect for improvement of the utilization of the active material mainly composed of nickel hydroxide. However, for obtaining the higher capacity, it is necessary to form a satisfactory electrically conductive network having a small amount of the cobalt compound added thereto.

In order to attain this subject, various proposals have been made on the amount and conditions for addition of metallic cobalt (hereinafter referred to as "metallic Co") or cobalt compounds such as cobalt oxide (hereinafter referred to as "CoO" and cobalt hydroxide (hereinafter referred to as "$Co(OH)_2$").

For example, it is proposed in JP-A-61 49374 to add $Co(OH)_2$ produced by a neutralization reaction between a cobalt sulfate solution and an aqueous alkali solution to an active material. However, addition of the $Co(OH)_2$ made by this process tends to be inactive higher-order cobalt compounds on the surface of the $Co(OH)_2$ at the time of the neutralization reaction. Therefore, the electrochemical oxidation efficiency to form CoOOH at the time of the initial charging lowers, which makes it difficult to form an electrically conductive network comprising CoOOH in the electrode. That is, even if $Co(OH)_2$ is added, any effect to improve the utilization of nickel hydroxide cannot be sufficiently brought out.

Furthermore, JP-A-62 237667 discloses that a cobalt sulfate solution and NaOH are added to a suspension of nickel hydroxide in water to precipitate $Co(OH)_2$ around nickel hydroxide, and, as a result, a high utilization can be obtained even when adding $Co(OH)_2$ in a small amount. When addition of the cobalt compound to the nickel electrode is carried out under such conditions, the surface of the $Co(OH)_2$ is apt to be coated with inactive higher-order cobalt compounds. Therefore, the effect of addition of $Co(OH)_2$ is not necessarily obtained.

Moreover, JP-A-62 66570 and JP-A-63 124370 show that in order to bring out the effect of the addition of $Co(OH)_2$, the formation of the higher-order cobalt compounds is inhibited by using $Co(OH)_2$ of 20 $m^2/g$ or less in specific surface area. However, according to this process, the effect to sufficiently improve the utilization cannot be obtained, because the active material utilization of positive electrode depends on the electrochemical oxidation efficiency for $Co(OH)_2$ to form CoOOH, which forms the electrically conductive network in the electrode. In general, the specific surface area of $Co(OH)_2$ is in inverse proportion to the particle size when the shape of the particles is the same. Therefore, the specific surface area of $Co(OH)_2$ increases only by decreasing the particle size of $Co(OH)_2$. Thus, it is needless to say that contact points between $Co(OH)_2$ and the substrate increase, and $Co(OH)_2$ is more readily electro-chemically oxidized.

Furthermore, it is proposed in JP-A-61 138458 to add CoO to an active material. The CoO forms very fine particles of CoOOH through the reactions of dissolution, diffusion precipitation, and electro-chemical oxidation. Therefore, this process is effective for improvement of the initial utilization of active material as compared with the addition of $Co(OH)_2$. However, the CoOOH electro-chemically formed from CoO is readily decomposed, and reduction of the utilization is apt to be brought about when the charge-discharge cycle is repeated at high temperatures. That is, the addition of CoO has an effect for improvement of the initial utilization of active material, but CoO is not necessarily an optimum additive in view of other characteristics of the positive electrode.

Moreover, an electrode plate filled with an active material at the time of fabrication of the plate is rolled to a desired thickness by pressing to adjust the thickness of the plate. However, at the time of pressing the plate, if the porosity is reduced as much as possible, the space in the resulting plate into which the electrolyte can penetrate is decreased. As a result, the positive electrode is in such a state as being insufficient in the amount of $OH^-$ ions which participate in the charge-discharge reaction, and this causes decreasing in the efficiency of electrochemical oxidation of the cobalt compound to CoOOH at the initial charging, namely, decreasing in the utilization.

In order to prevent the problems from occurring when CoO or $Co(OH)_2$ is added each alone as an additive for the positive electrode, it may be effective to use the CoO and $Co(OH)_2$ in combination, because it is supposed that the improvement of the initial utilization of active material may be secured by the addition of Coo and the charge-discharge cycle characteristics may be secured by the addition of $Co(OH)_2$. However, considering the mass-productivity of the positive electrodes or preparation of the pastes, the kind of the compounds added to nickel hydroxide is desirably as few as possible.

In order to effectively use these conflicting processes together, JP-A-3 145058 discloses to use a cobalt compound of CoO the surface of which is coated with a higher-order cobalt oxide as an additive to nickel hydroxide.

However, since such a process causes decrease of the solubility of COO in an alkaline electrolyte, namely, decrease in reactivity of CoO, it is necessary to increase the amount of the cobalt compound the surface of which is coated with a higher-order cobalt oxide. With increase in the amount of the cobalt compound, the amount of nickel hydroxide filled relatively decreases, resulting in decrease of an energy density per volume as a nickel positive electrode. Moreover, since the cobalt compounds are very precious and expensive materials, decrease of the amount of the cobalt compounds used is desired in view of resources and cost.

SUMMARY OF THE INVENTION

The present invention has solved the above problems, and the main object of the present invention is to provide an alkaline storage battery in which an active material of positive electrode has a high utilization of active material and which can maintain the high utilization even after subjected to long-term charge-discharge cycles as a battery.

DETAILED DESCRIPTION OF THE PREFERRED EMBODIMENTS

Figure 1:
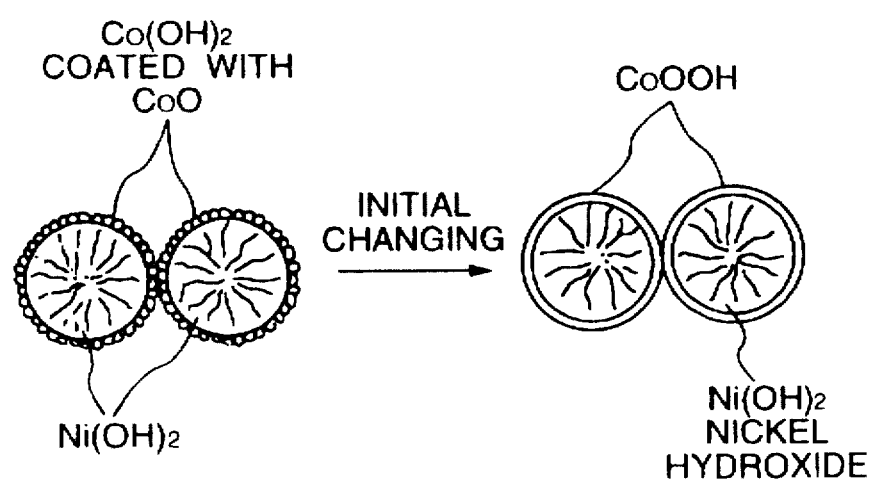
FIG. 1 is a schematic view which shows the reaction process of the cobalt compound used in the present invention.

The present invention which attains the above object is characterized by using, as an active material of positive electrode of an alkaline storage battery, $Co(OH)_2$ which has a specific surface area of 20–30 $m^2/g$ according to the BET method and is inhibited from production of higher order oxides on the surface thereof.

A preferred process for preparing such $Co(OH)_2$ comprises carrying out a neutralization between an aqueous solution of a cobalt salt such as cobalt sulfate, cobalt nitrate or the like and an aqueous solution of an alkali such as NaOH, KOH or the like in the presence of a reducing agent, mixing the resulting $Co(OH)_2$ with water by a medium stirring type grinder to sufficiently bring out the effect of addition of this $Co(OH)_2$ to nickel hydroxide, adding nickel hydroxide and water to the resulting mixture (slurry) to prepare a paste, and filling with the paste a substrate comprising a three-dimensional porous body.

Furthermore, in the present invention, it is also possible to use nickel hydroxide on the surface of which $Co(OH)_2$ is precipitated by dropwise adding a cobalt salt solution and an aqueous alkali solution to a slurry comprising nickel hydroxide and water in the presence of a reducing agent to carry out the neutralizing reaction. The above-mentioned $Co(OH)_2$ can be added to this nickel hydroxide or at least one of CoO and metallic Co can be added to this nickel hydroxide.

Furthermore, in the alkaline storage battery of the present invention, only a cobalt compound comprising $Co(OH)_2$ the surface of which is coated with CoO is added as an additive for the positive electrode in place of the above-mentioned method of using $Co(OH)_2$ and CoO in combination. The proportion of CoO in this cobalt compound is preferably 10–40% by weight on the basis of $Co(OH)_2$.

This cobalt compound can be obtained by a process which comprises heat treating $Co(OH)_2$ at 200°–500° C. for 3–30 hours in an inert atmosphere to form CoO on the surface thereof. It is preferred to add the cobalt compound to nickel hydroxide in an amount of 5–16% by weight based on the nickel hydroxide.

A reason for the cobalt compound improving the utilization of nickel hydroxide is generally considered that CoOOH which is an electrochemical oxidation product of the cobalt compound forms an electrically conductive network in the positive electrode. Therefore, it is important to efficiently oxidize the added cobalt compound to the trivalent CoOOH.

When only the initial utilization of active material is considered, a conventional process of adding CoO is most desirable as stated above. This is because CoO is electrochemically oxidized to CoOOH through reactions of dissolution, diffusion and precipitation and, therefore, forms an electrically conductive network comprising CoOOH of a very small particle size. However, the CoOOH of a small particle size lacks chemical stability and is readily decomposed upon repetition of the charge-discharge cycle in a battery.

Accordingly, as for long-term characteristics such as charge-discharge cycle, it is preferred to use $Co(OH)_2$ having a BET specific surface area of 20–30 $m^2/g$ and to form an electrically conductive network comprising CoOOH obtained by the electrochemical oxidation of said $Co(OH)_2$.

Furthermore, by using a nickel electrode comprising nickel hydroxide to which a major amount of $Co(OH)_2$ and a minor amount of CoO or metallic Co are added, it becomes possible to obtain an alkaline storage battery which is high in the utilization of active material from the initial stage and can maintain the utilization in long-term charge and discharge cycles.

For preparing such $Co(OH)_2$, a process is generally employed which utilizes a neutralization reaction between a cobalt salt and an aqueous alkali solution. However, $Co(OH)_2$ obtained by this process is oxidized with the dissolved oxygen in the reaction solution to produce inactive higher-order cobalt compounds on the surface. On the other hand, the utilization of positive electrode active material depends on the electrically conductive network comprising CoOOH electrochemically oxidized at the time of initial charging. Therefore, in order to improve the positive electrode active material utilization, it is important how to improve the electrochemical oxidation efficiency of the cobalt compound added. Factors which affect the electrochemical oxidation efficiency of the cobalt compound include the specific surface area of the cobalt compound and the inactive higher-order cobalt oxide produced on the surface. Since $Co(OH)_2$ of a higher specific surface area has more contact points with a substrate, the electrochemical oxidation efficiency to CoOOH is improved. However, with increase in the specific surface area, inactive higher-order cobalt compounds tend to be produced due to the dissolved oxygen in the reaction solution, and the electrochemical oxidation efficiency of $Co(OH)_2$ to CoOOH decreases.

Thus, the neutralization of a cobalt salt and an aqueous alkali solution in the presence of a reducing agent makes it possible to obtain a $Co(OH)_2$ having a large specific surface area in such a state as inhibited from production of the inactive higher-order oxides. This $Co(OH)_2$ having a large specific surface area agglomerates very easily and hence is hardly uniformly dispersed in a slurry or paste. However, an intense dispersion of the $Co(OH)_2$ with a medium stirring type grinder or chemical precipitation of the $Co(OH)_2$ around nickel hydroxide makes it possible to uniformly disperse the $Co(OH)_2$ in a slurry or paste to improve the active material utilization.

Furthermore, cobalt hydroxide may be partially converted to cobalt oxide by suitably adjusting conditions such as a temperature and time for heat treating cobalt hydroxide. Thus, a cobalt compound comprising cobalt hydroxide the surface of which is coated with cobalt oxide is obtained. In this case, the proportion of cobalt hydroxide and cobalt oxide in the cobalt compound may be optionally set by varying the above conditions.

Use of CoO and $Co(OH)_2$ in combination as additives for positive electrodes is known as aforementioned. However, as compared with addition of them as powders respectively, the cobalt compound comprising $Co(OH)_2$ the surface of which is coated with cobalt oxide according to the present invention has the following advantages.

(1) When a battery fabricated and filled with an alkaline electrolyte is left to stand, CoO on the surface of the cobalt compound is dissolved, by which the CoO diffuses and precipitates between adjacent primary particles of nickel hydroxide and between secondary particles formed by agglomeration of the fine primary particles. As a result, the alkaline electrolyte can easily penetrate into the sites where CoO has occupied before and these cobalt compounds have a high electrochemical oxidation efficiency to form CoOOH and, thus, decrease of the electrochemical oxidation efficiency by $Co(OH)_2$ can be inhibited.

(2) In the cobalt compound of the present invention, CoO present on the surface of $Co(OH)_2$ is dissolved and, thereafter, diffused and precipitated. This diffusion and precipitation stage is schematically shown in FIG. 1. Since only the $Co(OH)_2$ particles which are fine and have a large specific surface area are produced, a high electrochemical oxidation efficiency to form CoOOH can be obtained. The $Co(OH)_2$ particles provide the battery characteristics equal to or higher than those obtained by using fine $Co(OH)_2$ particles. Furthermore, problems such as the agglomeration and oxidation which occur when fine $Co(OH)_2$ particles are used can be prevented.

(3) Operability is improved because the number of the compounds added to nickel hydroxide diminishes from two to one.

That is, as compared with separate addition of each of CoO and $Co(OH)_2$, addition of $Co(OH)_2$ the surface of which is coated with CoO according to the present invention can improve the electrochemical oxidation efficiency of the cobalt compound and further improve the active material utilization with addition in a smaller amount, and simultaneously can also improve productivity.

The present invention will be illustrated with reference to the following examples referring to the accompanying drawings.

EXAMPLE 1

An investigation was conducted on $Co(OH)_2$ obtained by mixing a cobalt salt solution with an aqueous alkali solution.

An aqueous cobalt sulfate solution of 1 mol/l and an aqueous KOH solution having a specific gravity of 1.30 were added dropwise to an aqueous solution containing hydrazine (hydrazine monohydrate solution) as a reducing agent with controlling the pH to 11–12 and the temperature to about 40° C., and the mixture was vigorously stirred to perform neutralization. In this case, the amount of the hydrazine added was 5 ml for 1000 ml of the cobalt sulfate solution. The $Co(OH)_2$ obtained by the neutralization was washed with water and dried at 60° C. or lower to obtain $Co(OH)_2$ powder P of the present invention.

For comparison, $Co(OH)_2$ powder Q was obtained in the same manner as stated above without using the hydrazine. The properties of these $Co(OH)_2$ are shown in Table 1.

TABLE 1

|  | Color | BET specific surface area | Particle size |
|---|---|---|---|
| $Co(OH)_2$ powder P | Pink | 24 $m^2/g$ | 0.3 μm |
| $Co(OH)_2$ powder Q | Brown | 22 $m^2/g$ | 0.3 μm |

In the case of the $Co(OH)_2$ powder P of the present invention, the oxidation reaction with dissolved oxygen at the neutralization reaction was inhibited by the effect of addition of the reducing agent hydrazine and pink-colored $Co(OH)_2$ was obtained.

On the other hand, in the case of the $Co(OH)_2$ powder Q, higher-order oxides of cobalt such as $Co_3O_4$ were produced on the powder surface to give a brown color. When the fine powder (0.2–0.4 μm) as of the present invention is made by neutralization, chemical oxidation is apt to proceed, and it is difficult to obtain pink-colored $Co(OH)_2$. Generally, the pink colored $Co(OH)_2$, CoO or metallic Co is used as a cobalt compound used as an additive for positive electrodes, and is electrochemically oxidized to CoOOH at the time of initial charging to form an electrically conductive network to improve the utilization. However, when higher-order oxides of cobalt such as $Co_3O_4$ are formed on the surface of these cobalt compounds, the electrochemical oxidation reaction to CoOOH is hindered and the effect of adding these cobalt compounds cannot be sufficiently exhibited.

EXAMPLE 2

A mixture of the above $Co(OH)_2$ powder P and water at 1:2 by weight was mixed by a bead mill which was a medium stirring type grinder to prepare a slurry of cobalt hydroxide. The bead mill used here was a medium stirring type grinder comprising a dispersing tank which was filled with zirconia glass beads of 0.5–1.5 mm in diameter in an amount of about 80% based on the volume of the dispersing tank. The mixture was fed to the dispersing tank at a flow rate of 1000 mols/min and a disk which stirs the beads was rotated at a peripheral speed of 10 m/sec. Thus, $Co(OH)_2$ could be highly dispersed in the slurry. To this slurry was added a commercially available slurry comprising nickel hydroxide, followed by kneading for about 2 hours by a planetary mixer having two-shaft agitating blades to prepare a slurry of 35% in water content. The amount of $Co(OH)_2$ added was 10% by weight of nickel hydroxide.

With this slurry was filled a foamed nickel substrate having a thickness of 1.5 mm, a pore size of 200 μm and a porosity of 95%. Then, the substrate was dried at 90° C. for 30 minutes and pressed to a thickness of 0.65 mm. The resulting electrode was immersed in an aqueous solution containing 2% by weight of fluoro-carbon resin dispersion, then dried, and cut to be used for batteries of 4/5A size, followed by connecting a lead plate thereto by spot welding to obtain a nickel positive plate 1.

Figure 2:
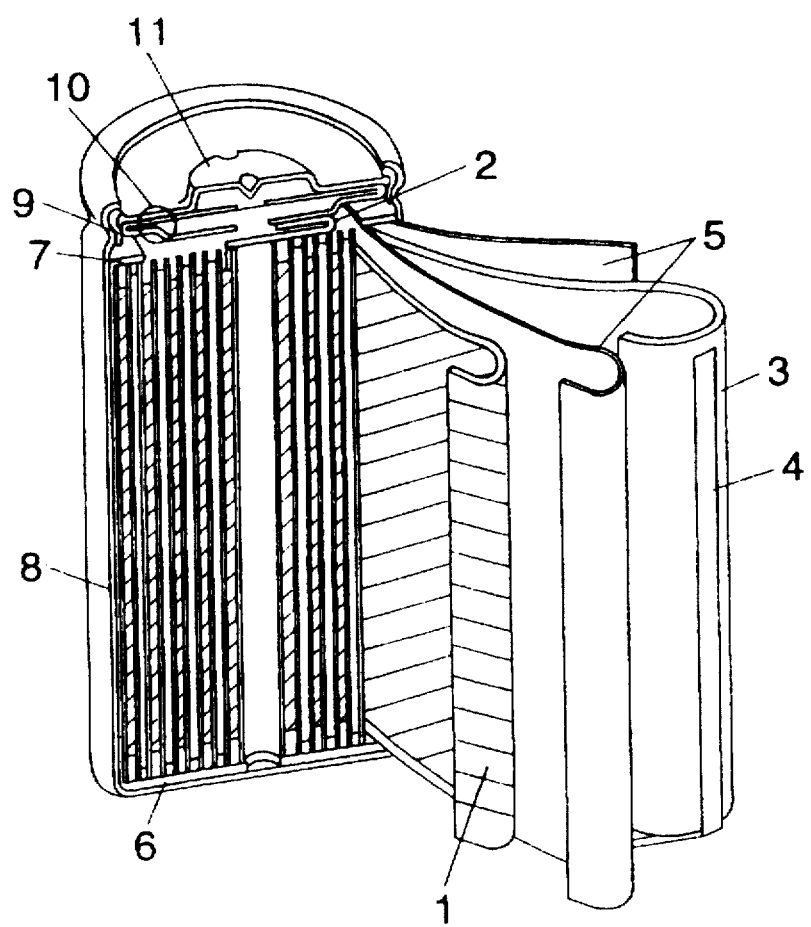
FIG. 2 is a sectional view of a nickel-hydrogen storage battery.

A hydrogen-absorption alloy was used for negative electrode. That is, $MmNi_{3.7}Mn_{0.4}Al_{0.3}Co_{0.6}$ (Mm: Misch metal mainly composed of La) which was a type of $MmNi_5$ was ground to obtain a powder of less than 360 mesh, to which was added an aqueous CMC solution having a concentration of 1.5% by weight to thereby obtain a paste. With this paste was filled a foamed nickel substrate having a porosity of 95% and a thickness of 0.8 mm. Then, the substrate was pressed to obtain an electrode of 0.4 mm thick. This was dried under a reduced pressure. To this was added an aqueous 5% fluorocarbon resin dispersion. The resultant hydrogen-absorption alloy electrode was cut for use in a 4/5A size battery to obtain a negative plate 2. The positive plate 1 and negative plate 2 were spirally wound together with a hydrophilized polypropylene nonwoven fabric separator 3 interposed therebetween to make an electrode plate group. The electrode plate group was put in a case 4 and this was filled with an electrolyte prepared by dissolving 30 g/l of lithium hydroxide in an aqueous potassium hydroxide solution having a specific gravity of 1.30 to fabricate a nickel-hydrogen storage battery of 4/5A size having a rated capacity of 1500 mAh as shown in FIG. 2. After this battery was left to stand at an ambient temperature of 25° C. for 12 hours, initial charging and discharging (charging: 0.1 C×15 hours; discharging: 0.2 C×5 hours) were carried out to obtain battery A as an example according to the present invention.

For comparison, 10% by weight of $Co(OH)_2$ powder P and commercially available nickel hydroxide were dispersed in water and kneaded by a planetary mixer having two-shaft agitating blades without using the medium stirring type grinder to prepare a slurry of 35% in water content. Using this slurry, a nickel-hydrogen storage battery of 4/5A size was fabricated in the same manner as stated above. This was battery B as a comparative example.

Furthermore, battery C as another comparative example was fabricated in the same manner as in making the battery A, except that the conventional $Co(OH)_2$ powder Q was used as the additive for positive electrode.

Furthermore, 1.2 l of a 1 mol/l cobalt sulfate solution and a KOH solution having a specific gravity of 1.30 were added dropwise to a slurry comprising 1 kg of nickel hydroxide, 1 l of water and hydrazine (hydrazine monohydrate solution) as a reducing agent while maintaining the pH at 11–12 and the temperature at about 40° C., and the resultant mixture was vigorously stirred to coat the surface of nickel hydroxide with 10% by weight of pink-colored $Co(OH)_2$ powder. The amount of the hydrazine added was 5 ml for 1000 ml of the cobalt sulfate solution. The thus obtained powder was washed with water and dried at 60° C. to obtain nickel hydroxide powder R of the present invention on the surface of which $Co(OH)_2$ was precipitated (hereinafter referred to as "$Co(OH)_2$-coated nickel hydroxide powder").

Water was added to this $Co(OH)_2$-coated nickel hydroxide powder R, which was then dispersed and kneaded by a planetary mixer having two-shaft agitating blades to prepare a slurry of 35% in water content. From this slurry, a nickel-hydrogen storage battery of 4/5A size was made in the same manner as stated above to obtain battery D of the present invention.

These batteries A to D were charged at 0.1° C. for 15 hours and discharged at 0.2° C., and the active material utilization was measured and the results are shown in Table 2. The active material utilization in this example is a ratio of the measured capacity to the theoretical capacity of nickel hydroxide which contributes to the charge and discharge.

TABLE 2

|  | Hydrazine | Color | Dispersing method | Utilization |
| --- | --- | --- | --- | --- |
| Battery A | Used | Pink | Bead mill | 99% |
| Battery B | Used | Pink | — | 92% |
| Battery C | Not used | Brown | Bead mill | 92% |
| Battery D | Used | Pink | Chemical coating on the surface of nickel hydroxide | 99% |

It can be seen from Table 2 that a high active material utilization was obtained in the batteries A and D of this example where $Co(OH)_2$ was made by using hydrazine for positive electrode. It can be considered that this is because oxidation of the surface of $Co(OH)_2$ to $Co_3O_4$ was inhibited by using hydrazine and the electrochemical oxidation efficiency to CoOOH which forms an electrically conductive network was improved as explained in Example 1.

However, as shown in the results on the battery B as comparative example, even when the pink-colored $Co(OH)_2$ finer than conventional ones which was prepared using hydrazine was used, the inherent characteristics cannot be brought out unless the $Co(OH)_2$ is uniformly dispersed in the slurry of active material by high dispersion treatment using a bead mill.

For uniformly dispersing the $Co(OH)_2$ in the paste of active material, there are a method of using a medium stirring type grinder such as a bead mill and a method of chemically precipitating $Co(OH)_2$ on the surface of nickel hydroxide as stated in preparation of the powder R of the present invention. As shown in the results on the batteries A and D, the utilization was substantially the same, and these methods made little difference.

EXAMPLE 3

$Co(OH)_2$ particles having various specific surface areas (according to the BET method) were obtained by adjusting the conditions of dropwise addition of KOH and the stirring conditions (speed and time) in making the $Co(OH)_2$ powder P. Using these $Co(OH)_2$, slurries were prepared by high dispersion treatment using a bead mill, and batteries were made in the same manner as in making the battery A.

Figure 3:
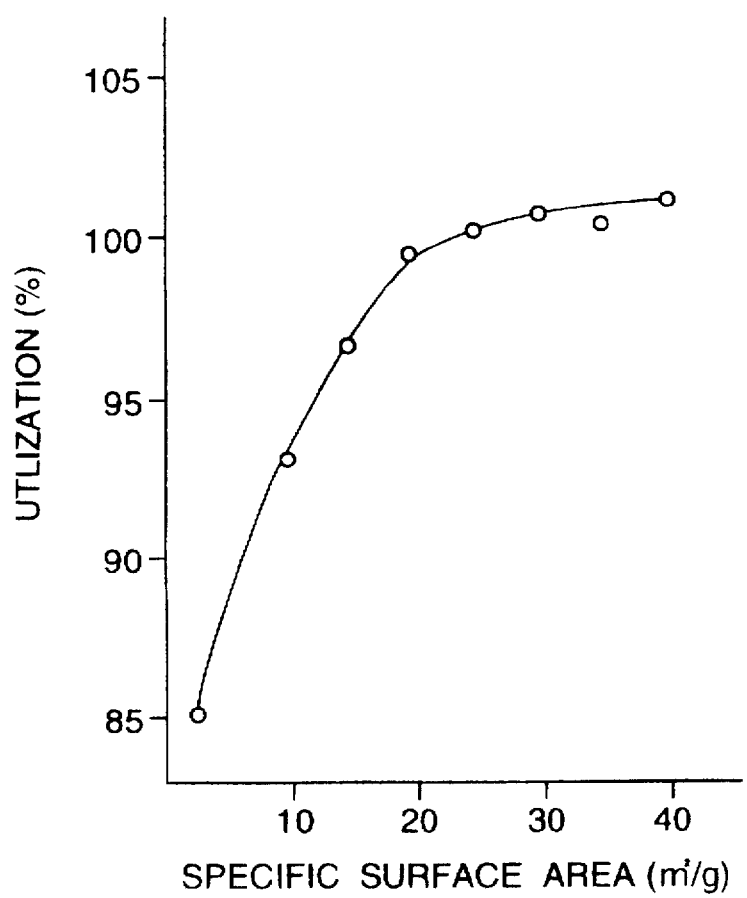
FIG. 3 is a graph which shows the relation between the BET specific surface area of $Co(OH)_2$ and the utilization of an active material of positive electrode.

FIG. 3 shows the relation between the BET specific surface area of the $Co(OH)_2$ prepared in this Example and the utilization of positive electrode active material of the batteries made using the $Co(OH)_2$. When the specific surface area is 20 m²/g or larger, a high utilization is obtained. However, when the specific surface area is too large, the neutralizing conditions and stirring conditions are hardly controlled, and $Co(OH)_2$ of a uniform quality cannot be obtained and, in addition, the productivity is reduced. Therefore, the specific surface area of the $Co(OH)_2$ is preferably 20–30 m²/g.

A CoO powder which has hitherto been used as an additive for positive electrodes was added in the same amount as that of $Co(OH)_2$ used in the battery A in terms of metallic cobalt, and a battery was made by kneading them, and filling with the paste was made in the same manner as in Example 2. This battery was battery E of a comparative example. Separately, 5% by weight of the $Co(OH)_2$ subjected to high dispersion treatment according to the present invention was added commercially available nickel hydroxide and, further, 4% by weight of CoO powder was added in the same amount as that of $Co(OH)_2$ used in the battery A in terms of cobalt atomic weight. The mixture was kneaded, and filling was made in the same manner as stated above, and a battery was fabricated using it in the same manner as stated above. This was battery F of an example according to the present invention. The utilization and high-temperature charge-discharge cycle characteristics of these batteries were measured, and the results are shown in Table 3. The high-temperature (40° C.) charge-discharge cycle characteristics were measured by charging: 1 C×150%, discharging: 1 C at a cut-off voltage of 1.0 V at 40° C.

TABLE 3

|  | Utilization | Cycle life characteristics |
| --- | --- | --- |
| Battery A | 99% | 400 cycles |
| Battery B | 110% | 150 cycles |
| Battery C | 108% | 350 cycles |

The battery E made by adding only the CoO powder was improved in the utilization over the battery A of the example made using the $Co(OH)_2$ powder P according to the present invention, but deteriorated to half or lower in the high-temperature charge-discharge cycle characteristics.

The charge-discharge reaction of $Ni(OH)_2$ is a reaction between divalent nickel ion and trivalent nickel ion as shown by the following formulas.

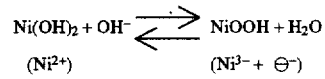

$$Ni(OH)_2 + OH^- \rightleftarrows NiOOH + H_2O$$
$$(Ni^{2+}) \quad\quad (Ni^{3+} + \ominus^-)$$

However, in the actual charge-discharge reaction, in the case of discharging at about 0.2 C, NiOOH remains and the discharging can be carried out to only a valence of about 2.2 as the whole active material. On the other hand, it is said that charging to a valence of about 3.2 is possible at the time of charging.

In this example, a deep discharging of a lower valence than 2.2 and production of higher-order oxides of higher than 3.2 in valence are possible by use of a more effective conductive agent as compared with the conventional example where CoO or the like was used. Therefore, as compared with theoretical capacity calculated assuming the change of valence of Ni to be 1, the change of valence in actual charging and discharging is more than 1, and the utilization calculated by the following formula exceeds 100%.

Utilization=(actual capacity/theoretical capacity)×100

The battery F made with using CoO and $Co(OH)_2$ in combination somewhat deteriorated in the high-temperature charge-discharge cycle characteristics, but was improved in the utilization as compared with the battery A.

The following reasons can be considered. In the case of using CoO, as mentioned heretofore, dissolution and precipitation of CoO take place by leaving the battery after filling with the electrolyte until the initial charging and discharging, resulting in coating of nickel hydroxide coated with very fine CoOOH to form an electrically conductive network and, thus, the utilization is improved. However, since such fine CoOOH is low in chemical stability, it is readily decomposed by high-temperature charge-discharge cycle and the effect of addition is lost, which is apt to cause decrease of the capacity.

On the other hand, in the case of $Co(OH)_2$, the reaction to CoOOH proceeds in solid phase reaction. Therefore, even when $Co(OH)_2$ of a small particle size as of the present invention is used, this does not result in the same coating with fine CoOOH as CoO gives.

That is, addition of CoO is effective for improvement of the initial active material utilization, and addition of $Co(OH)_2$ of the present invention is effective for improvement of characteristics having long-term reliability such as high-temperature charge-discharge cycle characteristics.

EXAMPLE 4

Figure 4:
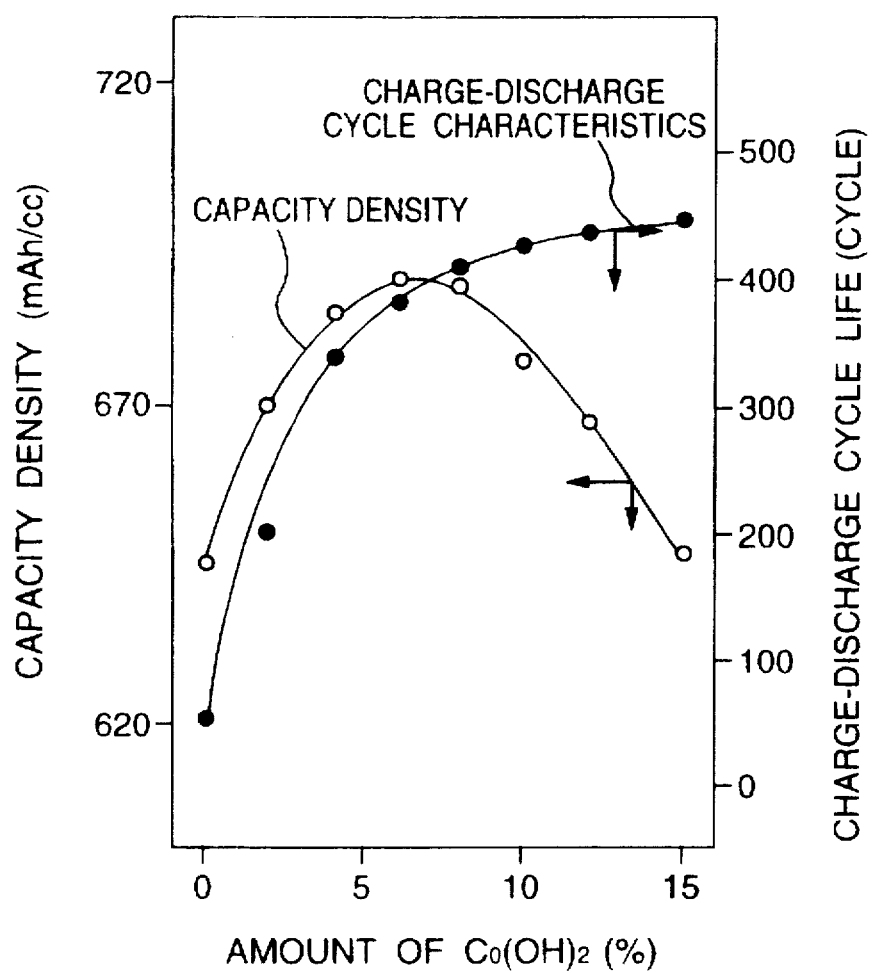
FIG. 4 is a graph which shows the relations between the amount of $Co(OH)_2$ and the capacity density and between the amount of $Co(OH)_2$ and the high-temperature charge-discharge cycle life.

In this example, in order to know the optimum amount of $Co(OH)_2$ of the present invention added to nickel hydroxide, capacity per unit volume of positive electrode (capacity density) and high-temperature charge-discharge cycle characteristics were examined. The results are shown in FIG. 4. With increase in the amount of $Co(OH)_2$, the high-temperature charge-discharge cycle characteristics were improved, but the capacity density decreased because of the relative decrease in the fill amount of nickel hydroxide. Considering both the characteristics of charge-discharge cycle and capacity density, the amount of $Co(OH)_2$ to be added is preferably 4–12% by weight (2.54–7.61% by weight in terms of metallic Co).

Next, in order to know the optimum amounts of $Co(OH)_2$ and CoO to be added, the relation between the amount of CoO powder and the utilization and the relation between the amount of CoO and the capacity density were examined with the amount of Co(OH)$_2$ being at a constant of 8% by weight.

Figure 5:
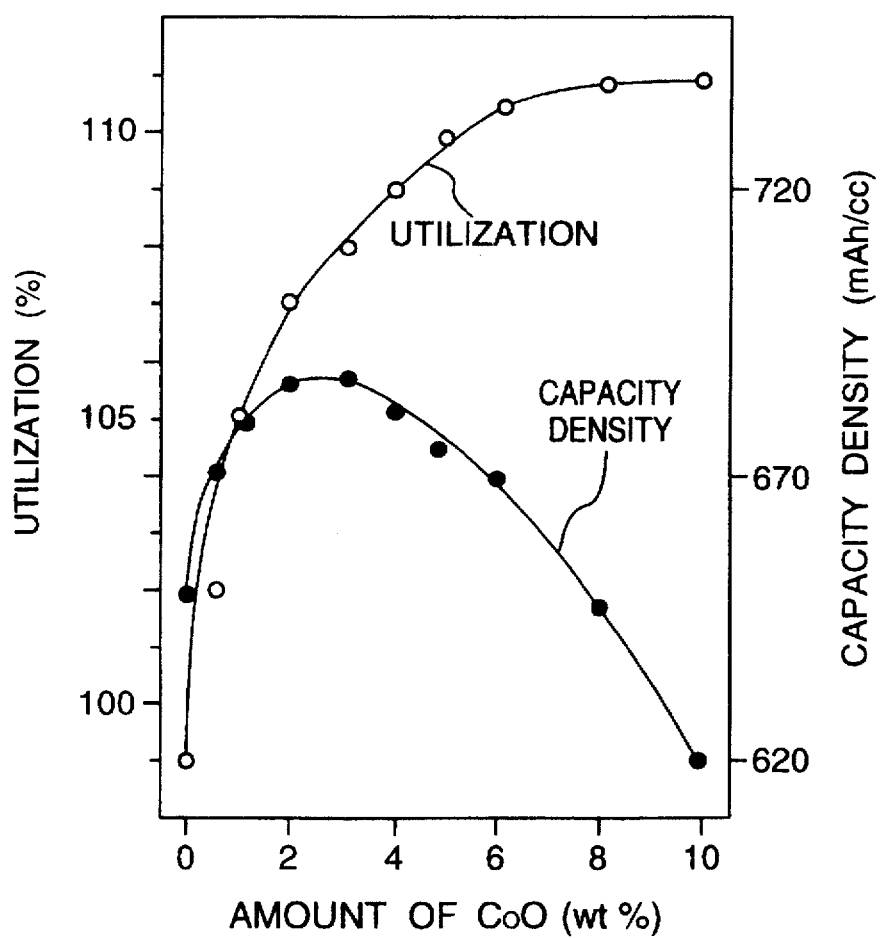
FIG. 5 is a graph which shows the relations between the amount of CoO powder and the utilization and between the amount of CoO powder and the capacity density.
Figure 6:
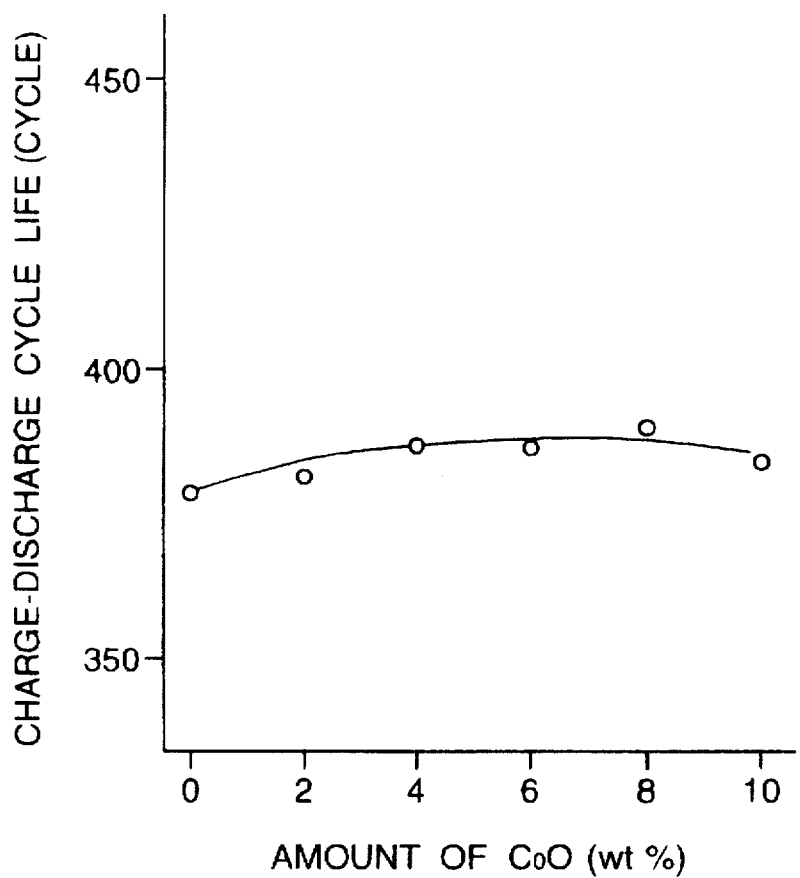
FIG. 6 is a graph which shows the relation between the amount of CoO powder and the charge-discharge cycle life at 40° C.

FIG. 5 shows the relation between the amount of CoO powder and the utilization and the relation between the amount of CoO powder and the capacity density, and FIG. 6 shows the relation between the amount of CoO powder and the high-temperature charge-discharge cycle characteristics at 40° C. It can be seen from FIG. 5 that with increase in the amount of CoO powder added, the utilization of active material was improved. However, the fill amount of nickel hydroxide relatively decreased to cause decrease of the capacity density. The charge-discharge cycle characteristics at 40° C. were not markedly improved even when the amount of CoO was increased.

That is, Co(OH)$_2$ is mainly added and the CoO powder may be added in only such an amount as sufficient to improve the initial utilization. Specifically, CoO may be added in an amount of 0.5–3.5% by weight in terms of metallic Co (0.63–4.45% by weight in terms of CoO) to nickel hydroxide.

As a result of conducting the above experiments with various added amounts, it has been found that when both the Co(OH)$_2$ of the present invention and the CoO are added to nickel hydroxide so that the total cobalt content is 4 to 10% by weight in terms of metallic Co, this exhibits good effects on both the initial capacity density and the high-temperature charge-discharge cycle characteristics.

In this example, a hydrogen-absorption alloy was used for a negative electrode, but the present invention relates to improvement of a nickel positive electrode, and the same effect can be obtained when cadmium is used for a negative electrode. Furthermore, the same effect can be obtained when the negative electrode comprises iron or zinc. Moreover, hydrazine was used as a reducing agent, but the same effect can be obtained using sodium hypophosphite, sodium borohydride, lithium aluminum hydride, etc. as a reducing agent.

In the above example, CoO was used as an additive, but the same effect can be obtained using metallic Co. Moreover, a bead mill was used as a medium stirring type grinder, but the same effect can be obtained using a ball mill, attritor, etc.

As the CoO added together with Co(OH)$_2$, it is preferred to use a cobalt compound having a non-stoichiometric composition represented by Co$_x$O (x×0.93–0.97). Cobalt monoxide represented by the formula CoO is produced by heat treating cobalt hydroxide as a starting material and, then, quenching the fired product in an inert gas atmosphere. In this case, by controlling the heat-treating and quenching conditions, it becomes possible to produce a non-stoichiometric cobalt oxide represented by the above Co$_x$O (x=0.93–0.97) With increase in a cooling rate of Co(OH)$_2$ in the heat-treated state, lattice defects introduced into the crystal increase, and the value x in CoxO decreases. This non-stoichiometric cobalt oxide is in the state where many lattice defects are present in the crystal, and movement of vacancies and free electrons becomes easy to exhibit a high electrical conductivity. Therefore, it becomes possible to carry out electrochemical and direct oxidization to CoOOH without passing through reactions such as dissolution in an alkaline solution, precipitation and electrochemical oxidation.

EXAMPLE 5

An explanation will be given on the specific example where cobalt compounds comprising cobalt hydroxide the surface of which was coated with cobalt oxide were examined.

Commercially available Co(OH)$_2$ having an average particle size of 2 µm was heat treated at 450° C. for 24 hours in an inert gas atmosphere to prepare a cobalt compound in which 25% by weight of the surface portion of Co(OH)$_2$ was coated with CoO. The resulting powder was added in an amount of 10% by weight to nickel hydroxide powder and then, a paste was prepared therefrom using an aqueous 2 wt% carboxymethyl cellulose (CMC) solution. With this paste was filled a foamed nickel substrate having a thickness of 1.5 mm, an average pore diameter of 200 µm and a porosity of 95% and dried at 90° C. for 30 minutes, followed by pressing to adjust the thickness to 0.65 mm. The thus obtained electrode was immersed in an aqueous 2 wt% dispersion of fluorocarbon resin, then dried, and cut to be used for batteries of 4/5A size, followed by connecting a lead plate thereto by spot welding to obtain a positive plate G of the example of the present invention.

For the sake of comparison, to a nickel hydroxide powder were added 7.5% by weight of Co(OH)$_2$ and 2.5% by weight of CoO (namely, 25% by weight of the cobalt compound being CoO), and an electrode was made in the same manner as in making the nickel positive plate G, except for the above adding proportion. This was a nickel positive plate H of conventional example.

Batteries were made in the following manner using these positive plates G and H.

A hydrogen-absorption alloy was used for negative electrode. That is, MmNi$_{3.7}$Mn$_{0.4}$Al$_{0.3}$Co$_{0.6}$ (Mm: Misch metal mainly composed of La) which was one of MmNi$_5$ was ground to 40 µm or smaller in the maximum particle size. To this ground hydrogen-storing alloy was added an aqueous CMC solution having a concentration of 1.5% by weight to obtain a pasty negative electrode active material. With this pasty active material was filled a foamed nickel substrate having a porosity of 95% and a thickness of 0.8 mm. Then, the substrate was pressed to obtain an electrode. This was dried under reduced pressure and thereto was sprayed an aqueous 5 wt% fluorocarbon resin dispersion. This negative electrode comprising the hydrogen-absorption alloy was cut to be used for a 4/5A size battery as in making the positive electrode, thereby to obtain a negative plate. These positive plate and negative plate were spirally wound together with a hydrophilized polypropylene nonwoven fabric separator interposed therebetween to make a plate group. The plate group was put in a battery outer can and this was filled with a given amount of an electrolyte prepared by dissolving 30 g/l of lithium hydroxide in an aqueous potassium hydroxide solution having a specific gravity of 1.30 to fabricate a nickel-hydrogen storage battery of 4/5A size and of the same construction as shown in FIG. 2 having a rated capacity of 1500 mAh. After this battery was left to stand at an ambient temperature of 25° C. for 24 hours, initial charging and discharging (charging: 0.1 C×15 hours; discharging: 0.2 C×5 hours) were carried out to obtain batteries G and H.

These batteries G and H were charged at 0.1 C for 15 hours and discharged at 0.2 C and a cut-off voltage of 1.0 V, and the utilization was measured and the charge-discharge cycle life after repetition of charging: 1 C×150% and discharging: 1 C at a cut-off voltage of 1.0 V at 40° C. was measured. The results are shown in Table 4.

TABLE 4

|  | Utilization | Charge-discharge cycle life |
|---|---|---|
| Battery G | 110% | 380 cycles |
| Battery H | 105% | 380 cycles |

It can be seen from Table 4 that the utilization was improved by using Co(OH)$_2$ the surface of which was coated with CoO according to the present invention. It is considered that this is because the electrochemical oxidation efficiency of Co(OH)$_2$ was improved by the reactions of dissolution, diffusion and precipitation of CoO as aforementioned.

EXAMPLE 6

In order to study the proportion of CoO in the Co(OH)$_2$ coated with CoO according to the present invention, batteries were fabricated in the same manner as in Example 5 and the relation between the proportion of CoO and the active material utilization and the relation between the proportion of CoO and the charge-discharge cycle characteristics at 40° C. were examined.

Figure 7:
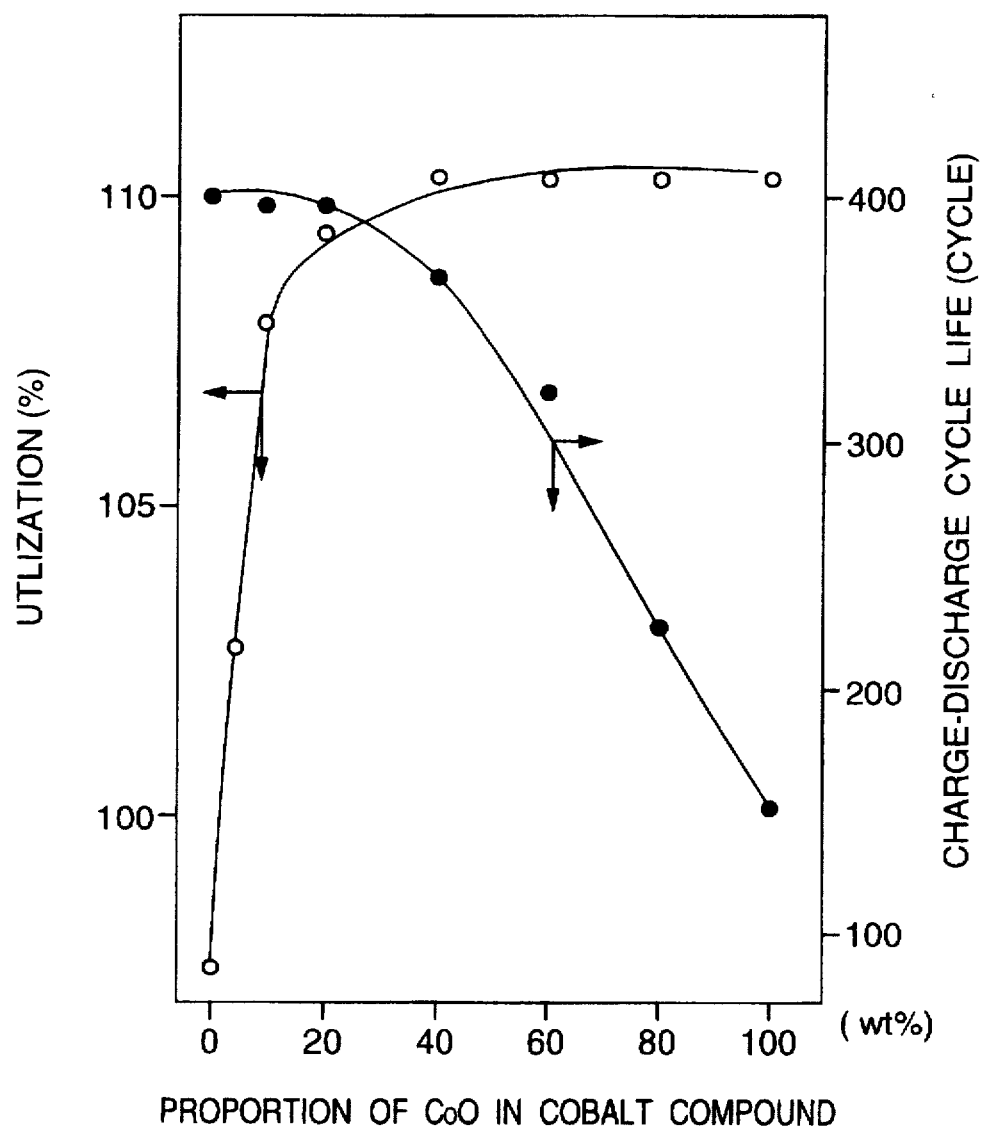
FIG. 7 is a graph which shows the relations between the content of CoO powder in cobalt compound and the utilization and between the content of CoO powder in cobalt compound and the charge-discharge cycle life.

FIG. 7 shows the change of the utilization and the cycle characteristics with increase in the proportion of CoO when the amount of cobalt added was 10% by weight in terms of cobalt hydroxide based on nickel hydroxide.

With increase in the proportion of CoO, the utilization increased while the charge-discharge cycle characteristics deteriorated. It is considered that this is because in the case of using CoO, an electrically conductive network comprising fine particles of CoOOH is formed through the reactions of dissolution, diffusion and precipitation of CoO and this is effective for improvement of the utilization while fine CoOOH is low in chemical stability and is readily decomposed by the charge-discharge cycle at high temperatures.

Nearly the same results as above were obtained even when the above experiments were conducted on various amounts of CoO, and it has been found that the proportion of CoO may be in such an amount as sufficient to improve the initial utilization, and when 10-40% by weight of cobalt hydroxide is CoO, this has good effects on both the utilization and the high-temperature charge-discharge cycle characteristics.

Figure 8:
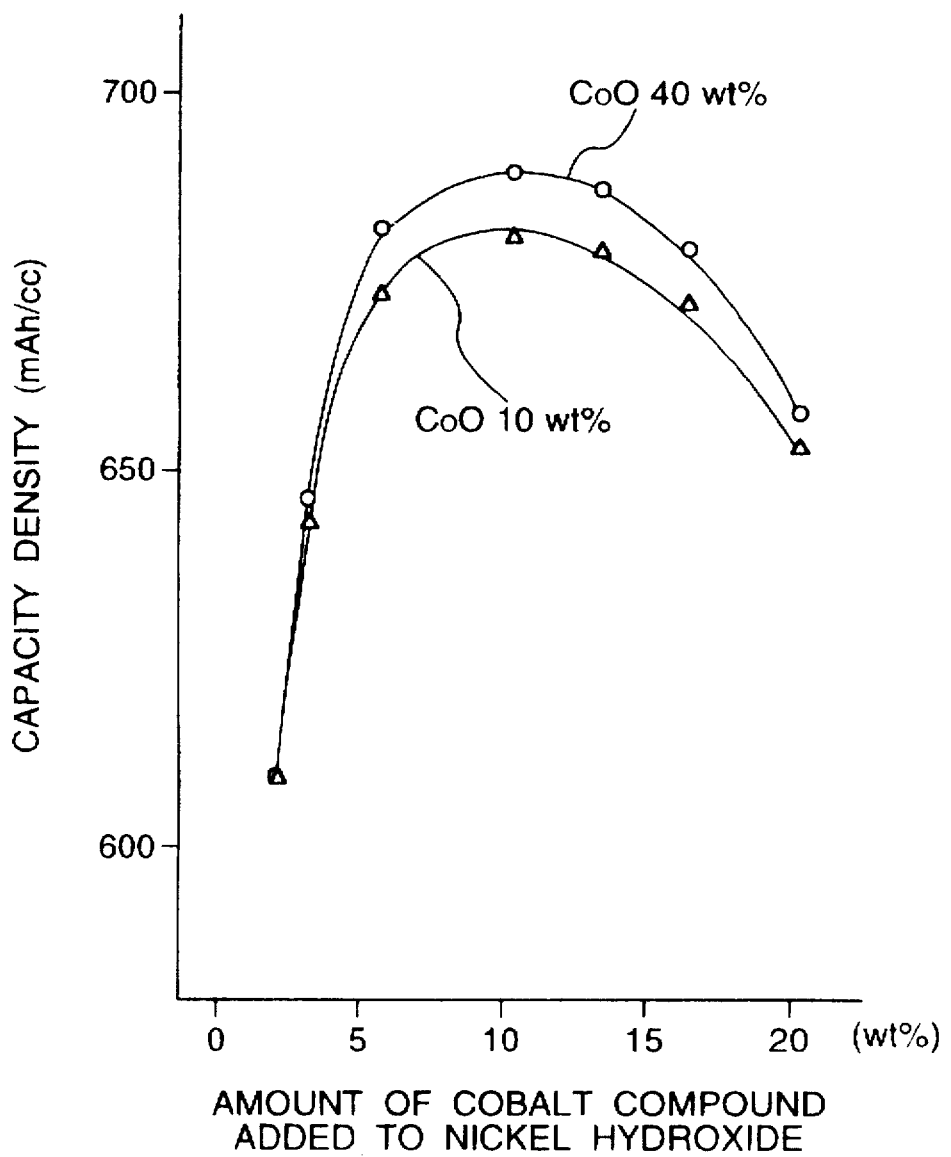
FIG. 8 is a graph which shows the relation between the amount of $Co(OH)_2$ the surface of which is coated with CoO and the capacity density.
Figure 9:
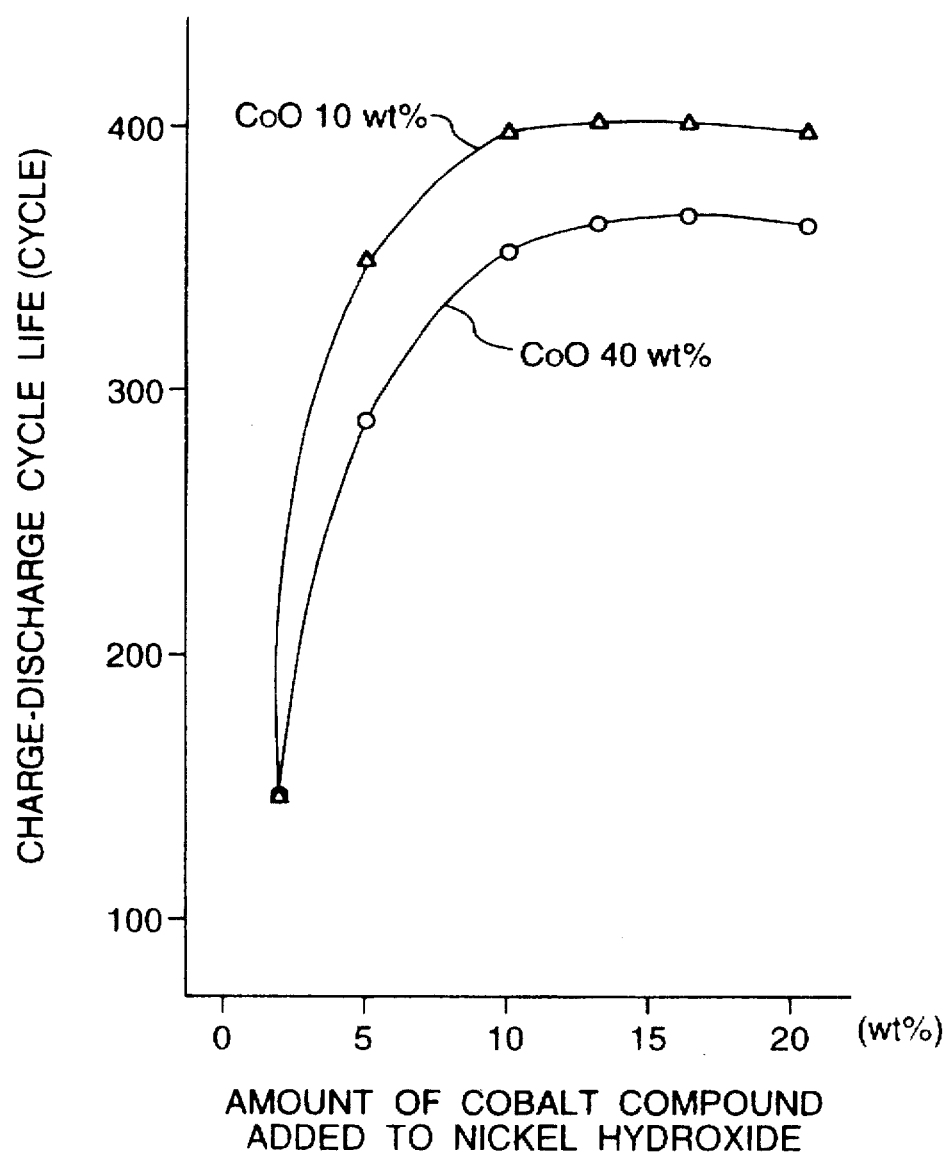
FIG. 9 is a graph which shows the relation between the amount of $Co(OH)_2$ the surface of which is coated with CoO and the charge-discharge cycle life.

Next, in order to study the optimum amount of Co(OH)$_2$ the surface of which is coated with CoO of the present invention for nickel hydroxide, the relation between the amount of the Co(OH)$_2$ and the capacity per unit volume of positive electrode (capacity density) and the relation between the amount of the Co(OH)$_2$ and the high-temperature charge-discharge cycle characteristics at 40° C. were examined. The results are shown in FIG. 8 and FIG. 9, respectively. In this case, the proportion of CoO in the cobalt compound was two kinds of 10% by weight and 40% by weight.

As can be seen from FIG. 8 and FIG. 9, with increase in the amount of the cobalt compound added, the high-temperature charge-discharge cycle characteristics were improved, but the fill amount of nickel hydroxide relatively decreased and the capacity density lowered in both cases. Therefore, the amount of the cobalt compound to be added is preferably 5-15% by weight, taking into consideration the cycle life and the capacity density.

It was attempted to make Co(OH)$_2$ the surface of which was coated with CoO according to the present invention by firing commercially available Co(OH)$_2$ having a particle size of 2 μm in an inert gas atmosphere at various temperatures and for various times. It was confirmed on the basis of X-ray diffraction patterns that the product comprised CoO and Co(OH)$_2$. Furthermore, the proportion of CoO and Co(OH)$_2$ was calculated by determining the amount of cobalt using electrogravimetry.

Figure 10:
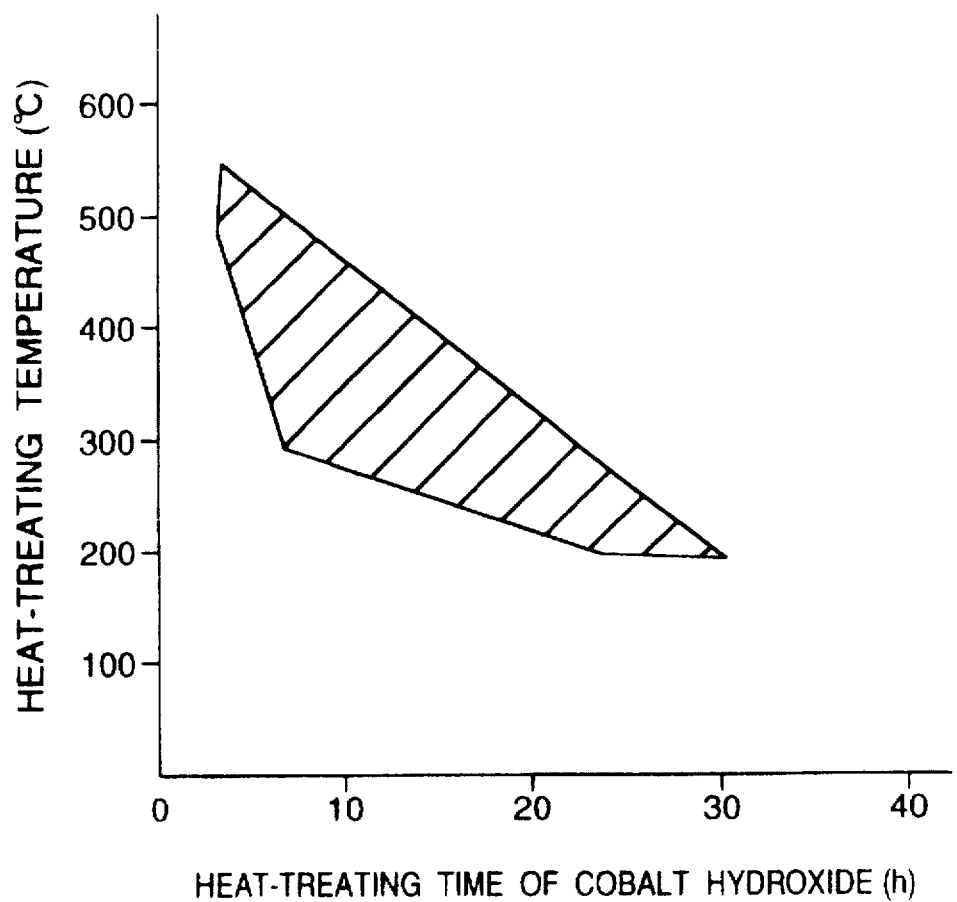
FIG. 10 is a graph which shows the relation between the heat-treating temperature and the firing time.

According to the present invention, it is possible to make Co(OH)$_2$ the surface of which is coated with CoO at various proportions, and the range of the heat-treating temperature and the heat-treating time in which there were no problems in active material utilization, high-temperature charge-discharge cycle characteristics and other characteristics of batteries when the batteries were made in the same manner as in making the battery A is shown by broken lines in FIG. 10.

It can be seen from the results that the ranges of 200°–550° C. and 3–30 hours are suitable as the heat-treating conditions of Co(OH)$_2$.

Since decomposition temperature of Co(OH)$_2$ is usually 150°–180° C., if the heat-treating temperature is lower than 200° C., CoO cannot be obtained even if the heat treating is carried out for a long time.

On the other hand, when the heat-treating temperature is higher than 550° C., battery characteristics such as the active material utilization are deteriorated though the reasons are not clear. It is considered that this is because sintering reaction takes place in the vicinity of the surface of Co(OH)$_2$ before dehydration reaction of Co(OH)$_2$ to CoO takes place, resulting in decrease of the specific surface area of the powder.

Figure 11:
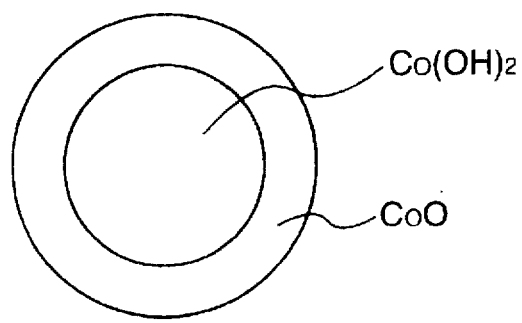
FIG. 11 is a schematic view of $Co(OH)_2$ the surface of which is coated with CoO.

FIG. 11 shows schematic view of spherical Co(OH)$_2$ the surface of which is coated with CoO. There is no strict limitation for the term "spherical", and they may be roundish particles having no angles on the surface and the section thereof may not have true circular shape. For example, they may be in the form of eggs or Rugby balls. In short, it suffices that the surface portion is formed of CoO.

As explained above, when Co(OH)$_2$ having a BET specific surface area of 20–30 m$^2$/g and made with inhibiting the surface from being coated with higher order oxides is uniformly dispersed in a positive electrode active material mainly composed of nickel hydroxide of alkaline storage batteries, or the surface of this Co(OH)$_2$ is coated with CoO or a small amount of CoO or metallic Co is added thereto, it has become possible to provide alkaline storage batteries which are higher in active material utilization as compared with conventional batteries and which can maintain the high utilization even after long-term charge-discharge cycle.

Moreover, by adding Co(OH)$_2$ the surface of which is coated with CoO by heat treating Co(OH)$_2$ in an inert gas atmosphere to a powder mainly composed of nickel hydroxide, both the capacity density and the life characteristics has been able to be improved as compared with using the conventional cobalt compounds.

What is claimed is:

1. An alkaline storage battery comprising a positive electrode, a negative electrode, a separator and an alkaline electrolyte, wherein the positive electrode comprises nickel hydroxide and cobalt hydroxide having a BET specific surface area of about 24–30 m$^2$/g, the cobalt hydroxide is prepared by a neutralization reaction by mixing a cobalt salt solution and an aqueous alkaline solution in the presence of a reducing agent, the nickel hydroxide is surrounded by CoOOH formed by electrochemically oxidizing at an initial charge of the battery from the cobalt hydroxide and forms an electrically conductive network.

2. A method for making a positive electrode for an alkaline storage battery comprising:

mixing a cobalt salt solution and an aqueous alkaline solution in the presence of a reducing agent to form cobalt hydroxide, adding the cobalt hydroxide to an active material of the positive electrode comprising nickel hydroxide to form a mixture, and preparing the positive electrode using the mixture.

3. A method according to claim 2, wherein the cobalt hydroxide has a BET specific surface area of 20–30 m$^2$/g.

4. A method for making a positive electrode for an alkaline storage battery comprising:

mixing a cobalt salt solution and an aqueous alkaline solution in the presence of a reducing agent to form cobalt hydroxide, mixing the cobalt hydroxide with water by a medium stirring type grinder to form a slurry, adding an active material of the positive electrode comprising nickel hydroxide to the slurry to prepare a paste, and preparing the positive electrode using the paste.

5. A method for making a positive electrode for an alkaline storage battery comprising:

mixing an active material of the positive electrode comprising nickel hydroxide with water to form a slurry, and adding a cobalt salt solution and an aqueous alkaline solution in the presence of a reducing agent to the slurry and precipitating cobalt hydroxide on the surface of the nickel hydroxide to form a second slurry, and preparing the positive electrode using the second slurry.

6. A method according to claim 5, further comprising coating the surface of the cobalt hydroxide with cobalt oxide, wherein the amount of the cobalt hydroxide, the surface of which is coated with cobalt oxide, is 3–10% by weight based on the total amount of active material in terms of metallic cobalt.

7. A method according to claim 5, further comprising coating the surface of the cobalt hydroxide with cobalt oxide, wherein the proportion of the cobalt hydroxide, the surface of which is coated with cobalt oxide, is 10–40% by weight based on the cobalt compound.

8. A method according to claim 5, further comprising coating the surface of the cobalt hydroxide with cobalt oxide by heat treating cobalt hydroxide at 200–550° C. for 3–30 hours in an inert gas atmosphere.

9. An alkaline storage battery according to claim 1, wherein the CoOOH-containing network is substantially free of inactive cobalt oxide of higher order than CoO.

10. An alkaline storage battery according to claim 1, wherein the CoOOH-containing network is substantially free of Co$_3$O$_4$.

11. An alkaline storage battery according to claim 1, wherein the BET specific surface area is based on N$_2$ gas adsorption of the cobalt hydroxide.

12. An alkaline storage battery according to claim 1, wherein prior to an initial charge of the battery, the cobalt hydroxide is coated with a cobalt oxide, and the CoOOH is formed by electrochemically oxidizing at the initial charge of the battery from the cobalt hydroxide coated with the cobalt oxide.

13. An alkaline storage battery comprising a positive electrode containing nickel hydroxide and cobalt hydroxide having a BET specific surface area of about 24–30 m$^2$/g, a negative electrode, a separator and an alkaline electrolyte, wherein in the positive electrode, the nickel hydroxide and the CoOOH which surrounds the nickel hydroxide exist as a mixture, the CoOOH forms an electrically conductive network, and the network is substantially free of inactive cobalt oxide of higher order than CoO, the CoOOH is formed from the cobalt hydroxide, and the cobalt hydroxide is prepared by a neutralization reaction by mixing a cobalt salt solution and an aqueous alkaline solution in the presence of a reducing agent and added to the positive electrode.

14. An alkaline storage battery of claim 13, wherein the CoOOH-containing network is substantially free of Co$_3$O$_4$.

15. An alkaline storage battery of claim 13, wherein the positive electrode comprises a porous substrate filled with a paste consisting essentially of said nickel hydroxide, said CoOOH and water and, optionally, CoOOH formed by electrochemically oxidizing at least one member of the group consisting of cobalt oxide and metallic cobalt.

16. An alkaline storage battery of claim 1, wherein the positive electrode comprises a porous substrate filled with a paste consisting essentially of said nickel hydroxide, said CoOOH, water and, optionally, CoOOH formed by electrochemically oxidizing at least one member of the group consisting of cobalt oxide and metallic cobalt.

17. An alkaline storage battery of claim 16, wherein the positive electrode consists essentially of said substrate and said paste.

18. An alkaline storage battery of claim 1, wherein the powder consists essentially of said nickel hydroxide, said CoOOH and water and, optionally, CoOOH formed by electrochemically oxidizing at least one member of the group consisting of cobalt oxide and metallic cobalt.

19. The alkaline storage battery of claim 1, wherein the CoOOH is uniformly dispersed.

20. A method of claim 2, wherein the positive electrode is made by filling a porous substrate with a paste consisting essentially of said nickel hydroxide, said cobalt hydroxide, water and, optionally, at least one member of the group consisting of cobalt oxide and metallic cobalt.

21. A method according to claim 2, wherein the cobalt hydroxide has a BET specific surface area of about 24–30 m$^2$/g.

22. A method according to claim 2, wherein the mixture further comprises adding at least one cobalt moiety selected from the group consisting cobalt oxide and metallic cobalt, and the amount of the added at least one cobalt moiety being 0.5–3.5% by weight based on the nickel hydroxide in terms of metallic cobalt, the total cobalt amount being 4–10% by weight based on the nickel hydroxide in terms of metallic cobalt.

23. A method according to claim 4, wherein the paste further comprises adding at least one cobalt moiety selected from the group consisting of cobalt oxide and metallic cobalt, and the amount of the at least one cobalt moiety added being 0.5–3.5% by weight based on the nickel hydroxide in terms of metallic cobalt, the total cobalt amount being 4–10% by weight based on the nickel hydroxide in terms of metallic cobalt.

24. A method according to claim 5, wherein the second slurry further comprises at least one selected from the group consisting cobalt oxide and metallic cobalt, and the amount of at least one selected from the group consisting cobalt oxide and metallic cobalt added being 0.5–3.5% by weight based on the nickel hydroxide in terms of metallic cobalt, the total cobalt amount being 4–10% by weight based on the nickel hydroxide in terms of metallic cobalt.

* * * * *